April 28, 1970 A. MARZOCCHI 3,508,990
METHOD OF PRODUCING A MULTI-ELEMENT GLASS CORD CONSTRUCTION
Filed Oct. 24, 1965
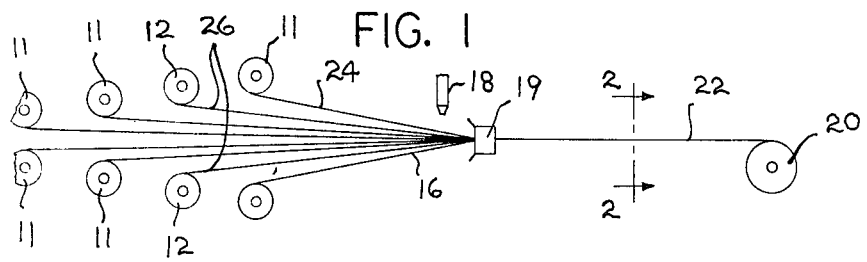
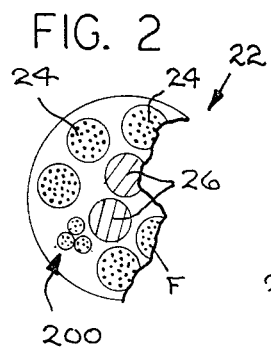
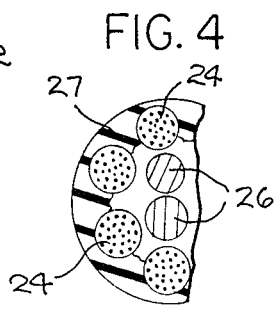
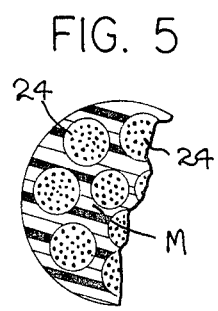
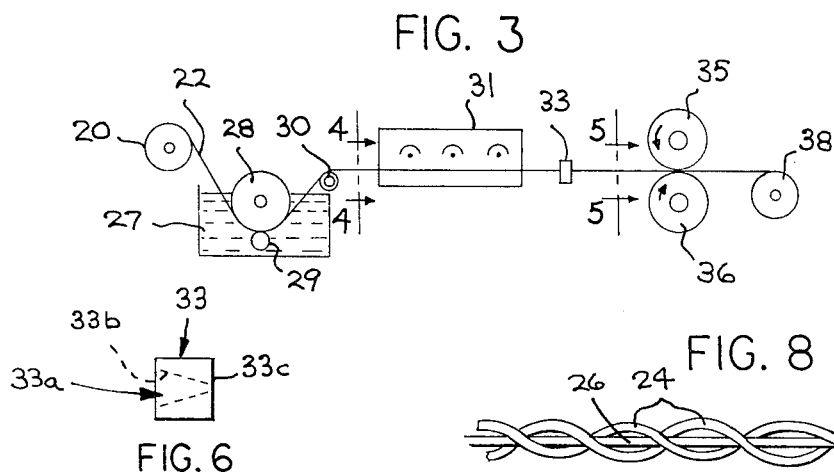
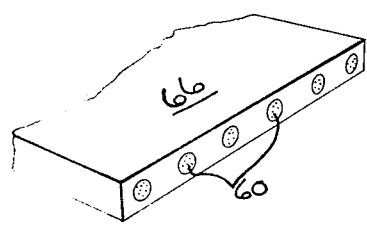
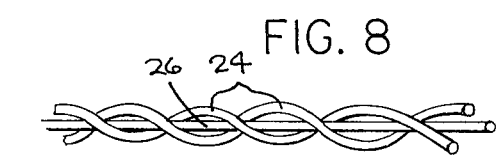
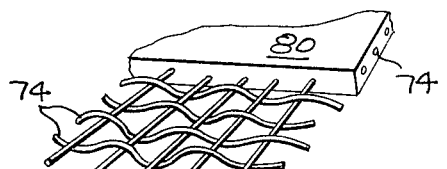
INVENTOR.
A. MARZOCCHI
BY
ATTORNEYS April 28, 1970     A. MARZOCCHI     3,508,990
METHOD OF PRODUCING A MULTI-ELEMENT GLASS CORD CONSTRUCTION
Filed Oct. 24, 1965     2 Sheets-Sheet 2

INVENTOR.
A. MARZOCCHI
BY
*Staelin & Overman*
ATTORNEYS

United States Patent Office 3,508,990
Patented Apr. 28, 1970

3,508,990
METHOD OF PRODUCING A MULTI-ELEMENT GLASS CORD CONSTRUCTION
Alfred Marzocchi, Cumberland, R.I., assignor to Owens-Corning Fiberglas Corporation, a corporation of Delaware
Filed Oct. 24, 1965, Ser. No. 504,626
Int. Cl. B32b 17/04
U.S. Cl. 156—166            10 Claims

ABSTRACT OF THE DISCLOSURE

A continuous cord is produced by a process featuring merging of continuous filaments of glass and at least one continuous filament of a heat-softenable organic filament followed by a heating, causing the organic element to flow into enveloping relationship with the glass filaments. In a preferred embodiment, the assembly is subjected then to an impregnation with a resinous material which cooperates with the interior organic to accomplish complete envelopment of the glass components.

---

The present invention relates generally to glass in fibrous form. More particularly, the present invention relates to a technique for treating and adapting fibrous glass in a novel manner as to convert it into a combined form capable of utilization in many reinforcement applications.

Individual fibers of glass, as drawn from the bushing in accordance with well-known fibrous glass manufacturing techniques, are possessed of remarkable physical properties. Unfortunately, it has proven extremely difficult, if not impossible, to translate these physical properties completely into the ultimate product into which the glass fibers are embedded as, for example, a plastic. The problem is even more acute in a flexible matrix.

The principal shortcoming exhibited by fibrous glass is the phenomenon frequently referred to as interfilament deterioration or destruction. Thus, when two fibers experience surface-to-surface contact, the result is a scratch formed on one or both contacting surfaces, ultimately resulting in a fracture or break at the scratch. When this occurs repeatedly in the case of glass fibers of a given length contained in the matrix, it is found that the individual fibers degenerate into extremely short lengths whereupon they do not exhibit a reinforcing function to the same degree as in their original length condition. To overcome this difficulty, a variety of "sizes" and coatings have been suggested in the past. These take the form of protective sheaths or coatings; the purpose of which is to isolate one fiber from the other. Other suggested coatings have been derived in an attempt to lend a coupling function to the fibrous glass. The "sizes" are generally imparted to the glass as it exists as a fiber shortly after drawn from the forming bushing.

Glass in fibrous form has found considerable acceptance in the reinforcement of plastic systems which are rigid in character. Most predominant of these systems is the polyester resin system wherein the glass fiber is incorporated into the resin matrix in the form of chopped fibers or chopped or continuous strand and/or roving. In this application, fibrous glass reinforced polyesters have found acceptance in fabricating boat hulls, automobile body parts, golf clubs, fishing rods, etc.

More recently, it has been proposed that fibrous glass be used as a reinforcing medium for elastomers and various rubbers by reason of the varied desirable properties of fibrous glass including a tensile strength of 500,000 pounds per square inch; an elastic recovery of 100%; a high modulus in the neighborhood of 10,000 pounds per square inch; a low coefficient of thermal expansion ($2.8 \times 10^{-6}$); and a very low water absorbency (0.3%). To date, however, these properties have not been realized to their ultimate potential when glass fibers have actually been combined with or incorporated into various elastomeric systems. This is due to the fact that in the elastomeric systems, which are inherently flexible, the fibers are found to come into contact with each other as the flexible elastomer is moved subject to load conditions. As a result, a scratch is imparted to the surface of the glass fiber whereupon it breaks into a smaller length. This action multiplied many times ultimately reduces the fibers of definite length into particle size practically whereupon little or no reinforcing is achieved.

With this foregoing general introduction, it may be stated that it is a general and overall object of the present invention to provide a method for treating glass elements in elongate form in such fashion as to reduce and in fact substantially eliminate altogether the propensity of the glass elements to lose their reinforcing character by being broken into smaller and smaller lengths.

It is still another object of the present invention to provide a method of treatment which includes a combining of the glass element into an elastomeric matrix.

It is another object of the present invention to provide an elongate fibrous glass element which is protected by an insulating sheath.

Glass fibers, as indicated earlier, are drawn from a bushing and attenuated into fibers. A plurality of these fibers, usually several hundred, are combined to form a strand and, in so doing, they are pretreated with a "size" to give them a preliminary protection, one from the other. These strands may then be combined by conventional textile operations to form yarns or rovings and/or cords. Each one of the foregoing is usually made up of a combination of the elements that preceded it in the series. Thus, a plurality of fibers make up a strand or a yarn. A plurality of yarns or rovings may be combined together with or without twist to form a cord. The foregoing elements, in addition to being treated with a "size," are frequently immersed in a bath of a protective substance in order to effect an impregnation of the multi-filament assembly, e.g., the strand, roving, or a cord, thereby promoting interfilament isolation.

It is a particular object of the present invention to provide an improved treatment which enhances the impregnation technique and which collaterally overcomes certain shortcomings of the impregnation technique.

Thus, with impregnation of a multi-filament assembly, it is found that the assembly is resistant to penetration of the impregnant into the interstices or voids within the center of the assembly. As a consequence, the usual treatment of multifilament assemblies of fibrous glass, by impregnation, frequently results in an incomplete impregnation such that the fibrous glass assembly is not protected and, additionally, it is found that air is trapped in the interior of the assembly which leads to further complications when the impregnated assembly is incorporated into the ultimate matrix for which reinforcement is desired.

In line with the foregoing, it is a particular object of the present invention to provide an improved method for protecting continuous glass element constructions whereby they are more universally incorporated into a variety of matrix systems.

It is still another object of the present invention to provide such a method as described generally hereinabove which can be carried out with conventional textile handling apparatus and techniques.

It is another object of the present invention to provide a method for producing an assembly of fibrous glass elements and a surrounding polymerizable matrix which assembly is adapted for incorporation into various rubber and elastomeric manufacturing processes.

It is still another object of the present invention to provide a combination fibrous glass element elastomeric stock substance which is utilizable in fabricating and vulcanizing manufactured rubber products.

The foregoing, as well as other objects of the present invention, will become apparent to those skilled in the art from the following detailed description taken in conjunction with the newly annexed sheets of drawings on which there are presented, for purposes of illustration only several embodiments of the present invention.

In the drawings

FIG. 1 is a schematic side elevation view of one step in the combining technique in accordance with the present invention.

FIG. 2 is a schematic sectional view taken on the line 2—2¹ in FIG. 1.

FIG. 3 is a schematic side elevation view of a succeeding step in the assembly technique in accordance with the present invention.

FIG. 4 is a schematic sectional view taken on the line 4—4¹ in FIG. 3.

FIG. 5 is a schematic sectional view taken on the line 5—5¹ in FIG. 3.

FIG. 6 is an elongated side elevation view of one of the forming elements in the assembly of components shown in FIG. 3.

FIG. 7 is a perspective view of portions of an elastomeric sheet containing an insulated glass fiber cord in accordance with the present invention.

FIG. 8 is a schematic illustration of an elongate glass fiber assembly in a preliminary stage of treatment and representing a variant embodiment of the present invention.

FIG. 9 is a perspective view of a sheet similar to that of FIG. 7, but illustrating a variant embodiment of the present invention.

Figure 10:
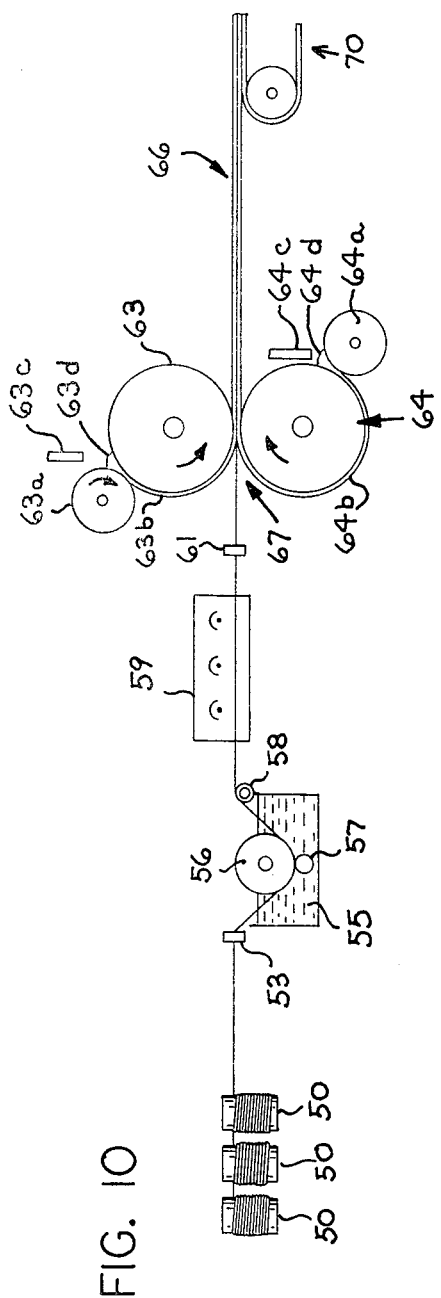
FIG. 10 is a schematic side elevation view of an assembly of apparatus in series and showing a process wherein glass cord is incorporated into an elastomeric sheet material.

In its most basic concept, the present invention envisions a method wherein a continuous assembly of glass elements and organic elements is formed with the organic elements being randomly distributed in the assembly and thereafter the assembly is moved into the sphere of influence of a stimuli effective to cause an outward flow of the organic elements into enveloping relationship with the fibrous galss elements.

In a preferred embodiment, the organic elements are heat softenable and the assembly of glass elements e.g., fibers, strands, rovings, cord, etc, having intermixed therewith a plurality of heat softenable elements, is passed through a heated oven to effect softening of the organic elements whereby they will flow into the so-called enveloping realtionship. In a more preferred embodiment, the assembly is subjected to a distortion, for example, a compression exerted radially inwardly, whereby the organic is forced to flow radially outwardly into enveloping relationship with the glass elements.

In still another embodiment of the present invention, glass fiber elements and organic fibers are arranged so that the organic fibers are majorly interiorly disposed in the assembly and thereafter, prior to the exposure to the stimuli of the flow of the assembly, is coated preferably by dipping into an impregnant substance whereupon ultimate exposure to heat causes the inner organic fiber to soften and flow outwardly to join the impregnating substance to thereby accomplish essentially complete isolation of the individual elements of the multiple element fibrous glass assembly, one from the other.

The invention will be more readily understood from a more detailed examination of the drawings and the following description.

In FIG. 1, there is disclosed a plurality of supply spools 11 and 12 which are mounted in rotatable fashion, permitting continuous lengths of material wound thereon to be drawn therefrom into converging relationship as at 16, past a spray nozzle 18, through an assembly die 19 and thence wound onto a receiving spool or drum 20. The spools 11 contain a continuous length supply of glass fibers, usually in the form of assemblies of glass fibers; that is, strands, yarns, rovings and/or cords. The spools 12 contain a continuous length supply of an organic fiber. The spray nozzle 18 issues a "size" which functions both as a preliminary protection and a binder to hold the plurality of elements together in assembled relationship; the assembly being identified by the reference numeral 22. The assembly 22 (FIG. 2) is composed of a juxtaposed plurality of glass fiber elements 24 and, interiorly thereof, organic fibers 26. The glass elements 24 are composed of subelements of glass, e.g., fibers F. Reference numeral 200 in FIG. 2 identifies a 3-strand cord assembly; each strand being formed of a plurality of individual fibers of glass.

The assembly of glass and organic elements 22 on the spool 20 is then unreeled (FIG. 3) and passed down into an impregnant bath 27 and between an upper roll 28 and a smaller lower roll 29 to enhance distribution of the impregnant. The assembly then proceeds upwardly out of the bath, about a roller 30 and through a heated oven 31, a die 33, between slightly spaced counterrotating rollers 35 and 36 and finally is wound on a wind-up roll 38. The bath 27 is an impregnant substance as hereinafter described. The die 33 is shown, enlarged in FIG. 6, as being composed of an interior passageway 33a having converging walls 33b which terminate in an orifice 33c proximately the size of the impregnated assembly of fibers (in section) whereby flow is induced in the heat softened organic 26. The assembly emerging from the bath 27 is illustrated schematically in FIG. 4 wherein it can be seen that the assembly of glass fiber strands 24 and organic fibers 26 is peripherally surrounded by impregnant 27 tending to proceed interiorly from the outer boundary defined by the juxtaposed glass fiber elements 24.

In FIG. 5, the assembly is schematically illustrated after passage through the oven 31 and the die 33. It can be seen that the glass fiber strands 24 are separated or isolated one from the other by a matrix M which represents a combination of the melted organic fibers 26 and the impregnating substance 27.

In FIG. 8, there is schematically disclosed a variant embodiment wherein glass elements 24 are spirally wound about an elongate central cord 26 constituting a heat softenable organic plastic fiber. In a manner similar to that described, the composite element of FIG. 8, as well as more complex assemblies, are subjected to an impregnation and thereafter to a stimulus coupled with a compressive force causing flow of the organic cord 26 whereby encapsulation of the glass elements occurs, resulting in isolation of the glass components.

FIG. 9 discloses a sheet of vulcanizable rubber material 80 containing a woven fabric composed of individual elements 73 and 74 of which either 73 or 74 constitutes the strand, yarn or cord assembly in accordance with a preferred practice of the present invention.

Figure 11:
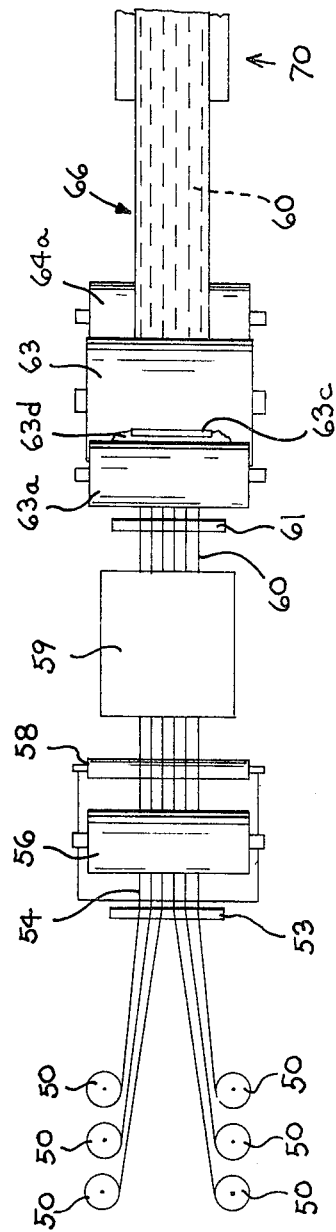
FIG. 11 is a top plan view schematically illustrating the arrangement as shown in FIG. 10.

In FIGS. 10 and 11, there is schematically represented a continuous process for incorporating the glass cords previously treated as in FIG. 1 into a matrix in the form of a continuous elongate sheet. The rotatable supply drums 50 each contain a continuous length of the assembly of glass fiber elements and organic plastic fibers previously identified in FIGS. 1 and 3 by the reference numeral 22. This composite assembly is passed over or through a comb 53 which arranges the assemblies into parallel array as at 54, whereupon they are passed downwardly into impregnant bath 55, between submerged rotating drums 56 and 57 which compress the assemblies therebetween to enhance the impregnation of the assembly. The assemblies then pass upward out of the bath about roll 58 and then into and through heated oven 59. From the oven, the assemblies, still in parallel array, pass through individual orifices in a transversely elongate die 61 which exerts a compression upon the individual assembly in the same manner as the die 33 in FIG. 3. The assemblies, still in parallel array, then pass between counter-rotating rolls 63 and 64 of a calender arrangement to effect embedding of the impregnated glass fiber organic assemblies into sheet form 66. Roll 63 in combination with counter-rotating drum 63a forms a layer of elastomeric stock 63b, onto roll 63, from the supply ribbon 63c of elastomeric stock fed into the nip zone 63d. Similarly, counter-rotating rolls 64 and 64a form a layer 64b of elastomer on roll 64 from the ribbon supply 64c, dropping into the nip 64d. The layers of elastomeric stock 63b and 64b converge as at 67 together with the spaced parallel array of assembled strands 60 to produce the calendered stock 66 which is carried away on the take-off conveyor 70. The cord assemblies 60 are shown in dotted line in FIG. 11. A segment of the calendered stock 66 is shown in FIG. 7, with glass fiber assemblies 60 shown in section.

The following are representative of size compositions which are applied to the glass fibers in forming and also in the initial assembly of the glass fiber elements and the organic elements as issuing from the spray gun 18.

EXAMPLE I

| | Percent by weight |
|---|---|
| Gamma-aminopropyltriethoxy silane | 0.5–2.0 |
| Glycerine | 0.3–0.6 |

EXAMPLE II

| | Percent by weight |
|---|---|
| Partially dextrinized starch | 8.0 |
| Hydrogenated vegetable oil | 1.8 |
| Lauryl amine acetate (wetting agent) | 0.4 |
| Non-ionic emulsifying agent | 0.2 |
| Glycylato chromic chloride | 1.0 |

EXAMPLE III

| | Parts by weight |
|---|---|
| Saturated polyester resin | 3.2 |
| Polargonate amide solubilized with acetic acid | 0.1 |
| Tetraethylene pentamine stearic acid | 0.1 |
| Polyvinyl alcohol | 0.1 |
| Polyvinyl pyrrolidone | 3.0 |
| Gamma-aminopropyltriethoxyl silane | 0.3 |
| Acetic acid | 0.1 |
| Water | 93.1 |

The size composition is merely applied to the glass fiber filaments as they are gathered together and the strand of sized glass fibers is allowed to dry in ambient air.

In the foregoing examples, the gamma-aminopropyltriethoxy silane can be replaced as an anchoring agent with other amino silanes such as gamma-aminopropylvinyldiethoxy silane, n(gamma-triethoxysilylpropyl)propyl)propylamine, beta-aminoallytriethoxy silane, aniline silane derivatives, etc.

By way of illustration, the following examples illustrate a few representative liquid compositions containing an elastomeric material which is used to impregnate the bundle or strand of glass fibers in the form of strands, yarns, rovings, etc.

EXAMPLE IV

| | Parts by weight |
|---|---|
| Neoprene rubber | 100 |
| Powdered magnesium oxide | 4 |
| Powdered zinc oxide | 5 |
| Channel black | 15 |
| Thiate B (trialkyl thiourea accelerator) | 1 |

The above ingredients after being mixed on a mill are combined with sufficient of an appropriate rubber solvent to form a liquid impregnant bath.

EXAMPLE V

| | Parts by weight |
|---|---|
| Paracril C rubber (Buna N) | 100 |
| SRF carbon black | 25 |
| Powdered zinc oxide | 5 |
| Aminox (reaction product of diphenyl amine ester) | 0.5 |
| Stearic acid | 1 |
| Dicumyl peroxide | 40 |

The above ingredients after being mixed on a mill are combined with sufficient of an appropriate rubber solvent to form a liquid impregnant bath.

EXAMPLE VI

| | Parts by weight |
|---|---|
| Lotol 5440—U.S. Rubber Company. Lotol 5440 is a 38% dispersed solids system including a butadiene-styrene-vinyl pyridine terpolymer latex, a butadiene styrene latex and a resorcinol-formaldehyde resin | 60 |
| Water | 39 |

EXAMPLE VII

| | Parts by weight |
|---|---|
| Resorcinol formaldehyde resin | 2 |
| Formalin (37% solution) | 1 |
| Concentrated ammonium hydroxide | 2.7 |
| Vinylpyridine terpolymer (42% latex) | 25 |
| Neoprene rubber latex (50% solids) | 41 |
| Butadiene latex (60% solids) | 5 |
| Sodium hydroxide | .05 |
| Gamma-aminopropyltriethoxy silane | 1 |
| Vulcanizing agent | 1 |
| Water | 1100 |

Preferably, the gamma-aminopropyltriethoxy silane is first neutralized with sufficient tetramethyl ammonium hydroxide to achieve a pH of about 13.

The organic fiber or element 26 is preferably a heat softenable plastic substance. Candidates include polyesters in fiber form; specifically, polyethylene terephthalate marketed commercially under the trade name "Dacron"; polyamide fibers, specifically, hexamethylene diamine adipate produced by reacting hexamethylene diamine and adipic acid and commercially known as nylon; polyurethane fibers which are reaction products of ethylene diisocyanate and ethylene glycol, for example, or polyacrylonitrile fibers marketed under the trade names "Orlon" and "Acrilan." Other suitable fibers are formed of polymerizates of polyvinyl alcohol, polyformaldehyde, cellulose acetate, polyvinyl chloride or copolymers of vinyl chloride and vinylidine chloride (marketed under the trade name "Saran"). Polyethylene, polypropylene and the polycarbonates also can be used as organic heat softenable fibers in forming the initial assembly of glass fibers and organic fibers.

In accordance with a particular embodiment of the present invention, the organic fiber assembled interiorally of the glass strands is desirably polymerizable or capable of further polymerization. Even more desirably, the fiber is copolymerizable with the substance contained in the impregnating bath 27.

Under certain circumstances, the organic fibers within the glass fiber strand assembly may be selected from the fluorocarbon resins, for example, polytetrafluoroethylene marketed under the trademark "Teflon" and polytrifluorochloroethylene marketed under the trademark "Kel-F." The latter two candidates are usable where it is desired that the ultimate cord have built within it a certain amount of slip as between the glass fiber element and the surrounding matrix. The fluorocarbon fibers also impart additional heat resistance, albeit that considerable more heat is necessary to cause an enveloping flow thereof about the glass fibers in the assembly.

Most acceptably and ideally, the organic fiber component of the preassembly is selected from those having a fairly moderate flow temperature in the range of 150° F.–250° F.

The insulated continuous cord produced in accordance with the method of the present invention may be utilized in chopped form as a reinforcement for a variety of matrix substances including plastics, resins, coatings, elastomers, etc. While the ultimate product containing the cord of the present invention is subjected to heat or is likely to be subjected to heat, it is preferred to select the organic fiber located interiorally of the assembly of juxtaposed glass fibers from those resins which become irreversibly set, e.g., thermosetting resins, such as the polyamide type, the polyethylene-terephthalate polyester type and the polyurethane type. On the other hand, for other applications, the organic fiber is desirably selected from the thermoplastic resins, e.g., polyethylene, polyvinyl chloride, polyacrylonitrile, etc.

The physical characteristics, e.g., melting point, tensile strength, dielectric constant, modulus, etc., of the organic fibers are well-known in the art and, accordingly, one choosing to practice the method of the present invention may select the appropriate organic fiber as will provide the properties desirable in the end application.

In the foregoing description and in the drawings, heat has been disclosed and taught as the stimulus or activating agent for effecting softening of the organic, followed by flow into enveloping relationship. It will be appreciated, however, that other stimuli or activating agent may be in some cases more preferable. Thus, in place of heat, it is envisioned that immersion in a solvent may be desirable to effect softening of the organic fiber and subsequent flow thereof into enveloping relationship. The impregnation bath 27 may itself in fact, in some cases, contain a softening component for the organic fiber 26 contained in the overall assembly 22 as well as containing an impregnant substance. Dielectric heating can also be used to soften the interiorally located organic elements.

It is also envisioned that bombardment with X-rays, gamma rays or other irradiations may be utilized to stimulate or activate the organic fiber into a condition of flow about the contiguous glass fibers.

Practice of the present invention is particularly advantageous since the combination of steps outlined may be carried out in an essentially continuous operation commencing with the basic glass element, e.g., the filament or any of the assemblies of filaments, e.g., strands, yarns, rovings, cords, proceeding ultimately to an insulated cord assembly or, as disclosed in connection with FIGS. 10 and 11, proceeding therebeyond to incorporate the insulated cord assembly in a novel manner into an elastomeric, vulcanizable sheet material having the insulated cords disposed therein in mutually parallel relationship.

This vulcanizable sheet material finds utility in a variety of applications in the rubber industry. Thus, the sheet material can be used as a carcass ply in tire manufacture or it can be employed as a peripheral "breaker strip" or "reinforcing band" beneath the tread portion of the tire. This sheet material can also be spirally wound and employed in hose manufacture. Similarly, it may be molded into a variety of shapes such as diaphragms, gaskets, etc. Other applications will suggest themselves to those skilled in the rubber art since the reinforced sheet provided hereby can be fabricated in various thicknesses as to fit various needs for a vulcanizable component in fabrication of different products from rubber.

I claim:

1. The method of producing a continuous glass fiber cord of improved properties, said method comprising the steps of:

forming a continuous length assembly of continuous glass filaments and continuous auxiliary elements, said auxiliary elements being concentrated majorly interiorly of the assembly and being formed of a material having a melting point lower than that of the glass filaments, moving said assembly through heat waves emanating from a heat generating source to soften said auxiliary elements, and compressing said assembly, thereby forcing said heat-softened auxiliary elements to flow into surrounding relationship with said glass filaments.

2. The method of producing a glass fiber cord material of improved properties, said method comprising the steps of:

forming an assembly of (1) continuous glass elements and (2) continuous organic fibers having a melting point lower than that of the glass elements, relatively moving said assembly through a liquid containing an elastomeric impregnant, said movement providing a pickup on said assembly of an effective amount of said elastomeric impregnant, and moving said assembly through a region of elevated temperature sufficient to cause said organic to soften and flow to thereby effect a joinder between said organic and said elastomeric impregnant whereby they cooperate to yield a glass fiber cord in which the glass elements are materially insulated one from the other.

3. The method of producing a composite cord containing continuous glass fiber elements embedded in a matrix, said cord being generally circular in cross section, said method comprising the steps of:

forming an assembled yarn of (1) continuous glass fiber elements and (2) continuous organic fibers having a melting point lower than the melting point of glass, contacting said assembled yarn with a bath of impregnant substance providing a substance-impregnation of the outer peripheral regions of said circular assembled components, exposing said coated assembly yarn to a temperature causing a softening of said organic fibers, and compressing the product of the preceding step to cause an outward radial flow of said heat-softened organic fibers, said impregnant substance and heat-softened organic fibers cooperating to yield a composite glass fiber cord in which the individual glass filaments are materially insulated one from the other.

4. The method of producing a glass fiber cord material of improved sectional properties, said method comprising the steps of:

forming an assembly composed of (1) a plurality of continuous glass elements and (2) a plurality of continuous organic fibers having a melting point lower than the glass, the latter generally located primarily interiorly of said assembly, impregnating the peripheral regions of said assembly with an elastomeric composition, said assembly including interior voids not filled by said impregnant, exposing said assembly to a temperature which softens said organic fibers, and subjecting said assembly to distorting force sufficient to induce radial flow of said heat-softened organic fibers sufficient to eliminate air, filling of said voids and contact of said organic with said impregnant substance, thereby yielding a glass cord in which the individual glass elements are materially insulated one from the other.

5. The method of producing a continuous, encapsulated, multiple-element bundle of inorganic elements, said method comprising the steps of:

gathering a plurality of continuous inorganic elements together into linear array, introducing interiorly of said array at least one additional continuous element formed of a material capable of undergoing plastic flow responsive to exposure to an activating agent, effecting relative contacting movement between said combined array and said activating agent to bring said additional element to a condition of plastic flow and compressing said array to cause said element to flow into enveloping relationship wit hsaid inorganic elements.

6. The method of producing a continuous, encapsulated, multiple-element bundle of continuous inorganic elements, said method comprising the steps of:

gathering a plurality of continuous glass elements and at least one continuous second element together to form a linear assembly, said second element being formed of a material capable of undergoing plastic flow responsive to exposure to an activating agent.

effecting a relative movement between said assembly and said activating agent to bring said activating agen and linear assembly together whereby said second element achieves a condition of plastic flow, and thereafter subjecting said assembly to distorting forces along its length, thereby causing said material to flow into enveloping relationship with said glass elements.

7. The method of producing a reinforced, vulcanizable, elastomeric sheet material comprising the steps of:

gathering together in juxtaposed relationship a plurality of continuous, elongate, inorganic elements, and at least one continuous, elongate, organic element, to thereby form an assembly thereof, arranging a plurality of said assemblies in spaced parallel array, effecting continuous relative movement and contact between said assemblies, still in parallel array, and a liquid impregnant substance to thereby achieve pickup of said impregnant, effecting continuous relative movement between said assemblies and an activating agent adapted to soften and induce flow of said organic element, and continuously introducing said parallel array of assemblies between converging layers of vulcanizable, elastomeric sheet material.

8. The method of producing a reinforced, vulcanizable, elastomeric sheet material comprising the steps of:

gathering together in juxtaposed relationship a plurality of continuous, elongate, inorganic elements, and at least one continuous, elongate, organic element to thereby form an assembly thereof, arranging a plurality of said assemblies in spaced parallel array, effecting continuous relative movement between said assemblies and an activating agent inducing softening and flow of said organic element about said inorganic elements, and continuously introducing said parallel array of assemblies between converging layers of vulcanizable, elastomeric sheet material.

9. The method of producing a reinforced, vulcanizable, elastomeric sheet material comprising the steps of:

gathering together in juxtaposed relationship a plurality of continuous, elongate, inorganic elements and at least one continuous, elongate, organic elements to thereby form an assembly thereof, arranging a plurality of said assemblies in spaced parallel array, effecting continuous relative movement between said assemblies, still in parallel array, and a liquid impregnant substance to thereby achieve pickup of said impregnant, effecting continuous relative movement between said assemblies and an activating agent adapted to lower the viscosity of said organic element, effecting continuous relative movement between said assemblies and means for compressing said assemblies, causing flow of said organic element, and continuously merging said parallel array of assemblies with vulcanizable, elastomeric sheet material in such fashion that said assemblies become embedded in said sheet material.

10. The method of producing a reinforced, vulcanizable, elastomeric sheet material comprising the steps of:

arranging a plurality of assemblies in spaced parallel array, each assembly being composed of a juxtaposed plurality of glass fiber elements and at least one heat softenable organic fiber interiorly thereof, moving said assemblies, in parallel array, through a liquid bath containing a substance adapted to impregnate each of said assemblies, moving said parallel array of assemblies through a heated zone causing softening and flow of said organic fibers in each assembly about said glass fiber elements, thereby providing isolation of individual glass elements in each assembly, and passing said assemblies, still in parallel array, into merging and embedding relationship with elastomeric, vulcanizable material to yield the desired product.

References Cited

UNITED STATES PATENTS

| 3,413,186 | 11/1968 | Marzocchi | 161—176 |
| 3,276,931 | 10/1966 | Rees | 156—441 XR |
| 3,231,540 | 1/1966 | Vanderbilt | 161—175 XR |
| 2,411,326 | 11/1946 | McMillin et al. | 156—176 XR |
| 3,255,875 | 6/1966 | Tierney | 156—178 XR |
| 2,415,023 | 1/1947 | Novotny | 156—179 |
| 3,042,569 | 7/1962 | Paul | 156—180 XR |

FOREIGN PATENTS 933,755   8/1963   Great Britain.

PHILIP DIER, Primary Examiner

U.S. Cl. X.R.

156—179, 180, 231, 437, 441; 161—144, 176